(12) United States Patent
Shin et al.

(10) Patent No.: US 9,933,132 B2
(45) Date of Patent: Apr. 3, 2018

(54) QUANTUM DOT COMPOSITE FILM AND BACKLIGHT UNIT USING SAME

(71) Applicant: LG ELECTRONICS INC., Seoul (KR)

(72) Inventors: Hyunkwon Shin, Seoul (KR); Jinmok Oh, Seoul (KR); Moongoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 329 days.

(21) Appl. No.: 14/649,709

(22) PCT Filed: Jan. 15, 2014

(86) PCT No.: PCT/KR2014/000422
§ 371 (c)(1),
(2) Date: Jun. 4, 2015

(87) PCT Pub. No.: WO2014/115992
PCT Pub. Date: Jul. 31, 2014

(65) Prior Publication Data
US 2015/0308658 A1 Oct. 29, 2015

(30) Foreign Application Priority Data

Jan. 23, 2013 (KR) .................. 10-2013-0007296

(51) Int. Cl.
| | |
|---|---|
| F21V 9/16 | (2006.01) |
| B32B 27/00 | (2006.01) |
| B32B 3/26 | (2006.01) |
| B32B 3/30 | (2006.01) |
| G02F 1/017 | (2006.01) |
| G02F 1/1335 | (2006.01) |

(52) U.S. Cl.
CPC ............. *F21V 9/16* (2013.01); *B32B 3/263* (2013.01); *B32B 3/266* (2013.01); *B32B 3/30* (2013.01); *B32B 27/00* (2013.01); *B32B 2255/10* (2013.01); *B32B 2307/416* (2013.01); *B32B 2307/418* (2013.01); *B32B 2307/42* (2013.01); *B32B 2307/7244* (2013.01); *B32B 2307/7246* (2013.01); *B32B 2457/202* (2013.01); *G02F 2001/01791* (2013.01); *G02F 2001/133614* (2013.01)

(58) Field of Classification Search
CPC ........... B32B 3/263; B32B 3/266; B32B 3/30; F21V 9/16
USPC ...................................................... 428/411.1
See application file for complete search history.

(56) References Cited

U.S. PATENT DOCUMENTS

| | | |
|---|---|---|
| 2011/0261303 A1 | 10/2011 | Jang et al. |
| 2012/0113672 A1 | 5/2012 | Dubrow et al. |
| 2012/0327683 A1 | 12/2012 | Yee |

FOREIGN PATENT DOCUMENTS

| | | |
|---|---|---|
| KR | 10-2011-0118476 A | 10/2011 |
| KR | 10-2012-0127077 A | 11/2012 |
| KR | 10-2012-0137075 A | 12/2012 |
| KR | 10-2012-0139122 A | 12/2012 |

*Primary Examiner* — Edward J Cain
(74) *Attorney, Agent, or Firm* — Birch, Stewart, Kolasch & Birch, LLP

(57) ABSTRACT

Provided is a quantum dot composite film. The quantum dot composite film includes a first barrier film, a quantum dot phosphor film disposed on the first barrier film, and a second barrier film disposed on the quantum dot phosphor film, wherein the first barrier film or the second barrier film is a dichroic mirror barrier film. Therefore, since the quantum dot composite film bonded to various optical functional films is provided, the number of optical films requires for a typical thin-film-type lighting apparatus may be effectively reduced.

29 Claims, 4 Drawing Sheets

QUANTUM DOT COMPOSITE FILM AND BACKLIGHT UNIT USING SAME

CROSS REFERENCE TO RELATED APPLICATIONS

This application is the National Phase of PCT International Application No. PCT/KR2014/000422, filed on Jan. 15, 2014, which claims priority under 35 U.S.C. 119(a) to Patent Application No. 10-2013-0007296, filed in the Republic of Korea on Jan. 23, 2013, all of which are hereby expressly incorporated by reference into the present application.

TECHNICAL FIELD

The present disclosure relates to a quantum dot composite film and a backlight unit manufactured therewith, and more particularly, to a quantum dot composite film bonded to various optical functional films and a backlight unit manufactured therewith.

BACKGROUND ART

A light-emitting diode backlight unit (LED BLU) which actually emits light is one of the most important elements of a liquid crystal display (LCD) TV.

According to one of methods for manufacturing a white LED BLU, red (R), green (G) and blue (B) LED chips with a small value of full width at half maximum (FWHM, a difference between a pair of wavelength values on a relative spectral distribution graph at which the dependent variable is equal to half of a maximum value thereof, with a unit of nm) are combined with each other.

However, according to this method in which red, green and blue LED chips are combined to manufacture a while LED BLU, the number of LED chips used is large and an additional feedback system is required to obtain a white color, causing an increase in the manufacturing cost.

A white color may also be obtained by combining a blue LED chip and a yellow (Y) phosphor that emits light having a wavelength with a large FWHM. According to this method, the number of LED chips is reduced to one third of the number of LED chips required for the above-mentioned method, and the feedback system is not necessary, so that the manufacturing cost of a BLU may be reduced. However, since a phosphor with a large FWHM is used, a color filter (CF) is necessarily required to provide red, green or blue color with high color purity for a corresponding spectrum. Since the CF blocks light of a wide wavelength range, light extraction efficiency of a device and the color purity are low, limiting color reproducibility.

Therefore, researches have been actively conducted to improve the color reproducibility and resolve the issue of low light extraction efficiency due to blocking of light of a wide wavelength range by a CF by replacing a typical phosphor having a large FWHM with a quantum dot having a small FWHM.

A quantum dot is a particle in which a nano-size II-IV semiconductor particle forms a core. Such a quantum dot emits light when an electronic exited to a conduction band falls back to a valence band.

Regarding the development of lighting based on a quantum dot phosphor, the quantum dot may emit light of various wavelengths according to a synthetic material thereof and a quantum dot size. Furthermore, the FWHM of a beam of emitted light is adjustable. Moreover, due to physical characteristics of the quantum dot, such as a small FWHM and a beam of emitted light of various wavelengths, a lighting apparatus that emits light similar to the light of the sun can be developed, and a BLU with high color reproducibility can also be developed.

However, when quantum dot phosphors are applied to such various fields, various expensive optical functional films are required to obtain uniform flat light within a short distance as the dot phosphors are applied to thin-film-type structures.

SUMMARY OF THE INVENTION

Embodiments provide a quantum dot composite film bonded to various optical functional films.

Embodiments also provide a backlight unit including a quantum dot composite film bonded to various optical functional films.

In one embodiment, a quantum dot composite film includes a first barrier film, a quantum dot phosphor film disposed on the first barrier film, and a second barrier film disposed on the quantum dot phosphor film, wherein the first barrier film or the second barrier film is a dichroic mirror barrier film.

At least one of the first barrier film, the quantum dot phosphor film and the second barrier film may have an embossing shape.

The quantum dot composite film may further include a patterned reflective film disposed between the quantum dot phosphor film and the second barrier film.

In another embodiment, a backlight unit includes a substrate, a reflective film disposed on the substrate, a plurality of semiconductor light-emitting elements disposed on the reflective film, a quantum dot composite film disposed on the semiconductor light-emitting elements, and an optical film disposed on the quantum dot composite film, wherein the quantum dot composite film includes a first barrier film, a quantum dot phosphor film disposed on the first barrier film, and a second barrier film disposed on the quantum dot phosphor film, wherein the first barrier film or the second barrier film is a dichroic mirror barrier film.

The backlight unit may further include a patterned reflective film disposed between the semiconductor light-emitting elements and the quantum dot phosphor film.

The patterned reflective film may be integrated into the quantum dot composite film. Here, the quantum dot composite film may include a first barrier film, a quantum dot phosphor film disposed on the first barrier film, a patterned reflective film disposed on the quantum dot phosphor film, and a second barrier film disposed on the patterned reflective film.

Furthermore, a composite film having an opposite structure to that of the quantum dot composite film may be used in a backlight unit. That is, such a quantum dot composite film may include a first barrier film, a patterned reflective film disposed on the first barrier film, a quantum dot phosphor film disposed on the patterned reflective film, and a second barrier film disposed on the quantum dot phosphor film.

In further another embodiment, a backlight unit includes a substrate, a reflective film disposed on the substrate, a plurality of semiconductor light-emitting elements disposed on the reflective film, a patterned reflective film disposed on the semiconductor light-emitting elements, a first barrier film disposed on the patterned reflective film, a phosphor film disposed on the first barrier film, a second barrier film disposed on the phosphor film, and an optical film disposed on the second barrier film.

The phosphor film may be a quantum dot phosphor film.

At least one of the first barrier film and the second barrier film may be a dichroic mirror barrier film.

At least one of the first barrier film, the phosphor film and the second barrier film may have an embossing shape.

The phosphor film may have a hole pattern, a line pattern, a groove pattern or an uneven pattern structure.

According to the present disclosure, since a dichroic mirror barrier film is used as a barrier film of a quantum dot composite film in order to be applied to a backlight unit, the reflectivity of a source beam emitted from a semiconductor light-emitting element is increased, thereby increasing interaction between a quantum dot phosphor and the source beam. Therefore, uniform light may be generated with high photo-conversion efficiency.

Furthermore, a quantum dot composite film integrated with a patterned reflective film to have combined optical functions may be provided. Therefore, by manufacturing a backlight unit using the quantum dot composite film, the number of optical films required for a backlight unit that requires various optical films may be remarkably reduced.

The technical effects of the present disclosure are not limited to the above-mentioned effects, and other technical effects would be clearly understood by those skilled in the art from the description below.

DETAILED DESCRIPTION OF EMBODIMENTS OF THE INVENTION

Figure 1:
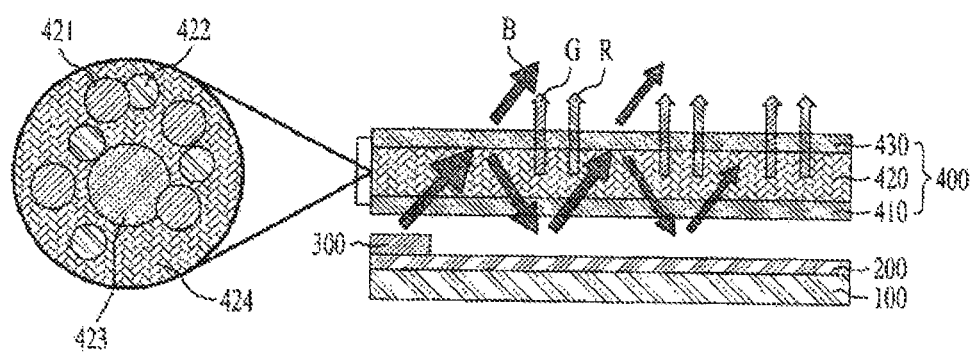
FIG. 1 is a cross-sectional view illustrating a quantum dot composite film according to an embodiment.

Hereinafter, embodiments will be described in detail with reference to the accompanying drawings.

Although the present disclosure allows various changes and modifications, specific embodiments are exemplarily illustrated in the drawings and are described below in detail. However, the embodiments are not intended to limit the present disclosure to specific forms, but should be construed as including all modifications, equivalents or alternatives that fall within the spirit of the present disclosure.

It will be understood that when an element such as a layer, a region or a substrate is referred to as being present "on" another element, it may be directly disposed on the other element, or intervening elements may be present therebetween.

Although the terms such as "first", "second" and the like may be used to describe various elements, ingredients, regions, layers and/or areas, such elements, ingredients, regions, layers and/or areas should not be construed as being limited to such terms.

A quantum dot composite film according to an embodiment includes a first barrier film, a quantum dot phosphor film disposed on the first barrier film, and a second barrier film disposed on the quantum dot phosphor film.

Here, the first barrier film or the second barrier film serves to prevent moisture and oxygen from infiltrating into the quantum dot phosphor film. Therefore, a life of a quantum dot phosphor may be increased by the first barrier film and the second barrier film.

The first barrier film or the second barrier film may have a structure in which various materials are stacked. For example, the first barrier film or the second barrier film may have a dichroic mirror structure of which stacked materials, a thickness, and the number of layers are adjusted to increase a reflectivity of a beam of a specific wavelength. For example, such a structure may be formed by stacking two or more different types of films having different refractive indices.

Therefore, in the case where a quantum dot composite film including a barrier film having the dichroic mirror structure is applied to a backlight unit including a light-emitting diode, a reflectivity of a source beam emitted from the light-emitting diode may be increased, and a recycling effect of the source beam may be improved due to an increase in the reflectivity. Therefore, as the recycling effect of the source beam is improved, a probability of a meeting between the source beam and a quantum dot is increased so that an efficiency of photo-conversion by the quantum dot may be improved.

Furthermore, the quantum dot composite film of the present disclosure may further include a patterned reflective film disposed between the quantum dot phosphor film and the second barrier film. Here, the quantum dot phosphor film may be patterned, and may have a hole pattern, a line pattern or an uneven pattern.

Here, the patterned reflective film may fill at least a part of a gap of a patterned structure of the quantum dot phosphor film.

Furthermore, the patterned reflective film may be disposed on the patterned structure of the quantum dot phosphor film. For example, the patterned reflective film may be disposed on a pattern corresponding to the patterned structure of the quantum dot phosphor film.

Furthermore, a composite film having an opposite structure to that of the quantum dot composite film may be provided. For example, such a quantum dot composite film may include a first barrier film, a patterned reflective film disposed on the first barrier film, a quantum dot phosphor film disposed on the patterned reflective film, and a second barrier film disposed on the quantum dot phosphor film.

FIG. 1 is a cross-sectional view illustrating a quantum dot composite film according to an embodiment.

FIG. 1 illustrates that a quantum dot composite film 400 is disposed on a substrate 100 on which a reflective film 200 and a semiconductor light-emitting element 300 are sequentially stacked, wherein a progressing path of light (a source beam) emitted from the semiconductor light-emitting element 300 is marked.

Referring to FIG. 1, the quantum dot composite film 400 includes a first barrier film 410, a quantum dot phosphor film 420 disposed on the first barrier film 410, and a second barrier film 430 disposed on the quantum dot phosphor film 420. Here, the second barrier film 430 is a dichroic mirror barrier film.

The quantum dot phosphor film 420 may include at least one type of a quantum dot phosphor.

The type of the quantum dot phosphor according to the present disclosure is not particularly limited, but may exemplarily include group II-VI or III-V elements, for example, any one selected from the group consisting of CdS, CdSe, CdTe, ZnS, ZnSe, ZnTe, HgS, HgSe, HgTe, GaN, GaP, GaAs, GaSb, AlN, AlP, AlAs, AlSb, InN, InP, InAs, InSb, Si, Ge and a combination thereof.

For example, the quantum dot phosphor film may include a first quantum dot phosphor 421 and a second quantum dot phosphor 422.

Here, the quantum dot phosphor film 420 has a structure in which the quantum dot phosphors 421 and 422 are distributed in a resin 424. The quantum dot phosphor film 420 may further include a scattering agent 423. This scattering agent 423 may increase an amount of light scattered when a source beam passes through the quantum dot phosphor film 420, so that a chance of a meeting between the source beam and the quantum dot phosphors may be increased.

It is assumed that the semiconductor light-emitting element 300 is a blue LED chip, the first quantum dot phosphor 421 of the quantum dot phosphor film 420 is a green quantum dot phosphor, and the second quantum dot phosphor 422 is a red quantum dot phosphor. In this case, when a blue light B emitted from the blue LED chip passes through the quantum dot composite film 400, a part of the light intactly passes therethrough, and another part of the light meets the quantum dot phosphors 421 and 422 so as to be converted into a green light G and a red light R and emitted upward.

Here, a part of the light may increase the reflectivity of the source beam, i.e., the blue light B, by virtue of the dichroic mirror structure, and the recycling effect of the source beam may be improved due to the increase in the reflectivity. The improved recycling effect of the source beam increases the probability of a meeting between the source beam, i.e., the blue light B, and the quantum dot phosphors, so that the efficiency of photo-conversion by the quantum dot phosphors may be increased.

In the case where the first barrier film 410 or the second barrier film 420 has the dichroic mirror structure as described above, the reflectivity of the source beam may be increased, which improves the recycling effect of the source beam so that interaction between the quantum dot phosphors and the source beam is increased. Therefore, uniform light may be generated with high photo-conversion efficiency.

Figure 2:
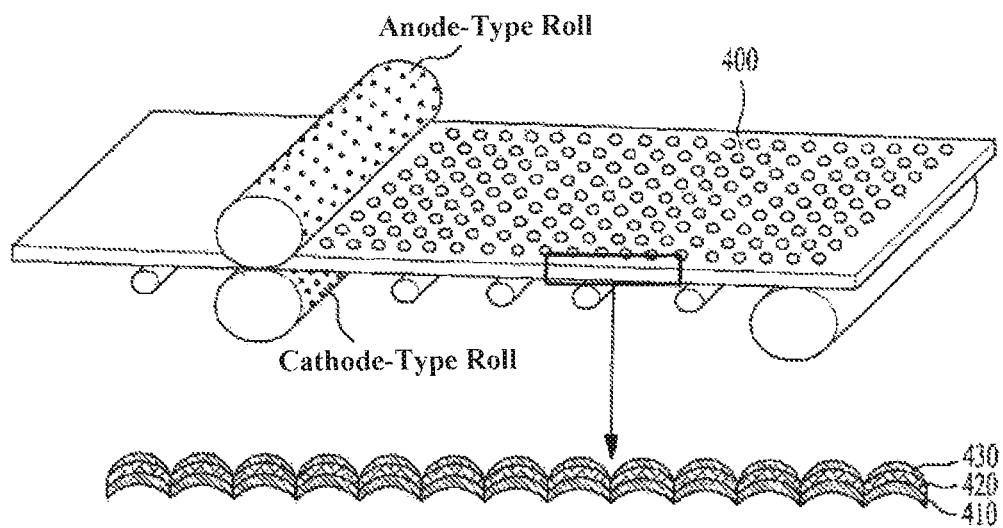
FIG. 2 is schematic diagram illustrating a quantum dot composite film and a method for manufacturing the same according to an embodiment.

FIG. 2 is schematic diagram illustrating a quantum dot composite film and a method for manufacturing the same according to an embodiment.

Referring to FIG. 2, the quantum dot composite film 400 includes the first barrier film 410, the quantum dot phosphor film 420 disposed on the first barrier film 410, and the second barrier film 430 disposed on the quantum dot phosphor film 420. The first barrier film 410 or the second barrier film 430 may be a dichroic mirror barrier film.

Here, the quantum dot composite film 400 may have a patterned shape. For example, the quantum dot composite film 400 may have an embossing shape. For example, at least one of the first barrier film 410, the quantum dot phosphor film 420 and the second barrier film 430 may have an embossing shape.

Such an embossing-type structure of the quantum dot composite film 400 may be formed through a rolling process at which a temperature is adjustable.

For example, as illustrated in FIG. 2, an anode-type roll is disposed on the quantum dot composite film 400, and a cathode-type roll is disposed under the quantum dot composite film 400, so that the quantum dot composite film 400 may be embossed through a rolling process with temperature adjustment.

A reflective-film-integrated quantum dot composite film including a patterned reflective film will be described in detail with reference to FIGS. 3 to 5.

Figure 3:
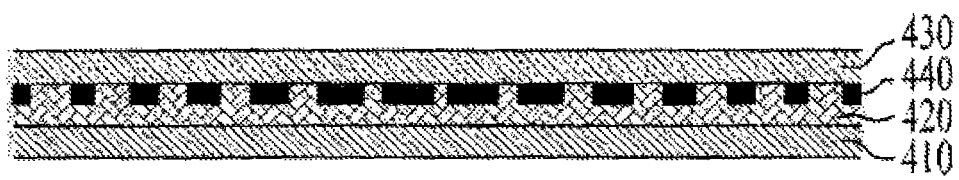
FIG. 3 is a cross-sectional view illustrating a quantum dot composite film according to an embodiment.

FIG. 3 is a cross-sectional view illustrating a quantum dot composite film according to an embodiment.

Referring to FIG. 3, the quantum dot composite film 400 includes the first barrier film 410, the quantum dot phosphor film 420 disposed on the first barrier film 410, and the second barrier film 430 disposed on the quantum dot phosphor film 420. The first barrier film 410 or the second barrier film 430 may be a dichroic mirror barrier film.

The quantum dot phosphor film 420 may have a patterned structure. For example, an upper part of the quantum dot phosphor film 420 may have an uneven pattern.

Therefore, a patterned reflective film 440 may fill at least a part of a gap in the uneven pattern of the quantum dot phosphor film 420.

Figure 4:
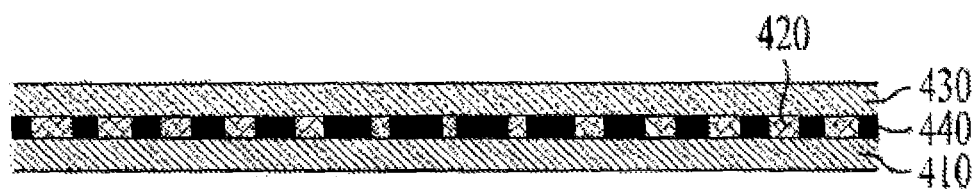
FIG. 4 is a cross-sectional view illustrating a quantum dot composite film according to an embodiment.

FIG. 4 is a cross-sectional view illustrating a quantum dot composite film according to an embodiment.

Referring to FIG. 4, the quantum dot composite film 400 includes the first barrier film 410, the quantum dot phosphor film 420 disposed on the first barrier film 410, and the second barrier film 430 disposed on the quantum dot phosphor film 420. The first barrier film 410 or the second barrier film 430 may be a dichroic mirror barrier film.

The quantum dot phosphor film 420 may have a hole pattern. The patterned reflective film 440 may fill at least a part of a hole of the pattern of the quantum dot phosphor film 420.

Figure 5:
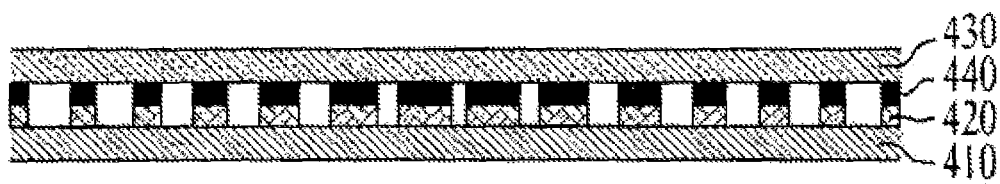
FIG. 5 is a cross-sectional view illustrating a quantum dot composite film according to an embodiment.

FIG. 5 is a cross-sectional view illustrating a quantum dot composite film according to an embodiment.

Referring to FIG. 5, the quantum dot composite film 400 includes the first barrier film 410, the quantum dot phosphor film 420 disposed on the first barrier film 410, and the second barrier film 430 disposed on the quantum dot phosphor film 420. The first barrier film 410 or the second barrier film 430 may be a dichroic mirror barrier film.

Here, the quantum dot phosphor film 420 may have a hole pattern, and the patterned reflective film 440 may have the same hole pattern corresponding to the hole pattern of the quantum dot phosphor film 420.

According to the reflective-film-integrated quantum dot composite film in which the patterned reflective film 440 is disposed in a quantum dot composite film, the source beam is reflected by the patterned reflective film 440 so as to be widely spread in the form of flat light. Furthermore, the source beam reacts with the quantum dot phosphor film 420 while being uniformly spread, so that a photo-converted beam, for example, a red beam and a green beam, may be emitted.

Therefore, a beam that is finally emitted from the reflective-film-integrated quantum dot composite film becomes a uniform white beam. The quantum dot composite film having such characteristics may enable a reduction in the number of optical functional films used in a thin-film-type BLU, and is thus advantageous in terms of cost. Furthermore, the quantum dot composition film is advantageous for rendering a lighting apparatus thin.

Hereinafter, a backlight unit manufactured using the above-described quantum dot composite film will be described.

Figure 6:
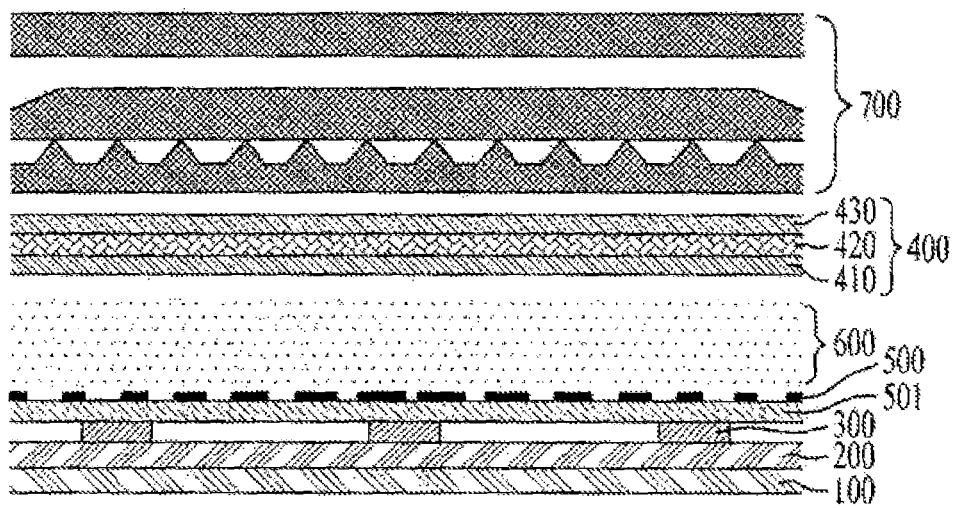
FIG. 6 is a cross-sectional view illustrating a structure of a backlight unit according to an embodiment.

FIG. 6 is a cross-sectional view illustrating a structure of a backlight unit according to an embodiment.

Referring to FIG. 6, a backlight unit includes a substrate 100, a reflective film 200 disposed on the substrate 100, a plurality of light-emitting elements 300 arranged on the reflective film 200, a patterned reflective film 500 disposed on the semiconductor light-emitting elements 300, a quantum dot composite film 400 disposed on the patterned reflective film 500, and an optical film 700 disposed on the quantum dot composite film 400.

Here, the quantum dot composite film 400 may include a first barrier film 410, a quantum dot phosphor film 420 disposed on the first barrier film 410, and a second barrier film 430 disposed on the quantum dot phosphor film 420. The first barrier film 410 or the second barrier film 430 may be a dichroic mirror barrier film.

The substrate 100 may be a printed circuit board (PCB).

The reflective film 200 disposed on the substrate 100 reflects light that is emitted downwards from the semiconductor light-emitting elements 300, i.e., emitted towards the substrate 100, so that the light is emitted upwards.

The reflective film 200 may be manufactured by mixing phenyl propanol amine (PPA), an epoxy molding compound (EMC), micro cell polyethylene terephthalate (MCPET), silver (Ag), aluminum (Al) metal having an excellent reflectivity, a bead having a reflective, transmissive or refractive characteristic such as Ti, Al, Ag or $SiO_2$, with resin.

The semiconductor light-emitting element 300 may be a light-emitting diode provided with a first clad layer, a second clad layer, and a light-emitting layer (active layer) disposed therebetween. The first clad layer may be a semiconductor layer into which a first-type impurity such as an n-type impurity is injected. The n-type impurity may be Si, N, B or P. The second clad layer may be a semiconductor layer into which a second-type impurity such as a p-type impurity is injected. The p-type impurity may be Mg, N, P, As, Zn, Li, Na, K or Cu. Furthermore, the active layer may have a quantum dot structure or a multi quantum well structure. For example, the semiconductor light-emitting element 300 may be a gallium-nitride-based light-emitting diode that emits blue light.

The patterned reflective film 500 is disposed on the semiconductor light-emitting element 300. A support substrate 501 may be further disposed under the patterned reflective film 500 to support the patterned reflective film 500. The support substrate 501 may be made of any material that is transparent and is able to support the patterned reflective film 500. The support substrate 501 may not be provided in some cases.

The patterned reflective film 500 is a reflective sheet that serves to transmit a part of light emitted vertically upwards from the semiconductor light-emitting element and reflect the other part of the light, and a plurality of screen patterns may be formed in the patterned reflective film 500.

The patterned reflective film 500 suggested in the present embodiment is a hole-patterned reflective sheet in which a plurality of holes are formed. That is, light emitted from the semiconductor light-emitting element 300 or reflected from the reflective film 200 disposed on the substrate 100 may pass through the holes, and a part of the light blocked by a region other than the holes may be reflected towards the reflective film 200.

Furthermore, the holes may have a larger radius as they are farther away from a center of the light-emitting element 300, so that an amount of transmitted light is larger than an amount of reflected light at a location spaced apart from the semiconductor light-emitting element 300. This is because an intensity of light is higher at a closer location to the semiconductor light-emitting element 300 and is lower at a farther location from the semiconductor light-emitting element 300. Therefore, it is preferable that the amount of light transmission is larger at a farther location from the semiconductor light-emitting element 300 and is smaller at a closer location to the semiconductor light-emitting element 300 so that a luminance of light is uniformly maintained over an entire display panel.

A spacer (not shown) for maintaining a distance between the semiconductor light-emitting element 300 and the patterned reflective film 500 may be further included. Such a spacer may have various forms such as a bar that extends straightly or a plurality of short ribs arranged at regular intervals. Such a spacer may include poly carbonate (PC), poly methyl methacrylate (PMMA), glass, resin, phenyl propanol amine (PPA), aluminum metal or the like so as to have a light transmissive, refractive or reflective characteristic. An adhesive may be applied to a top surface and a bottom surface of the spacer and UV curing or heat curing may be performed thereto in order to bond the spacer.

The quantum dot composite film 400 includes the first barrier film 410, the quantum dot phosphor film 420, and the second barrier film 430. The first barrier film 410 or the second barrier film 430 may be a dichroic mirror barrier film.

The optical film 700 may include optical films having various functions. For example, the optical film 700 may include an optical sheet such as a lower polarizing plate, a color filter substrate, and an upper polarizing plate. Since such an optical film has the same structure and function as those of a typical flat display panel, a detailed description of the optical film is not provided.

Furthermore, the backlight unit may further include a diffusion plate 600 between the patterned reflective film 500 and the quantum dot composite film 400 or between the quantum dot composite film 400 and the optical film 700.

The diffusion plate 600 may serve to uniformly diffuse irregular light emitted from light sources arranged in a certain array on a bottom of the backlight unit, i.e., the semiconductor light-emitting elements 300, and support various optical sheets.

Figure 7:
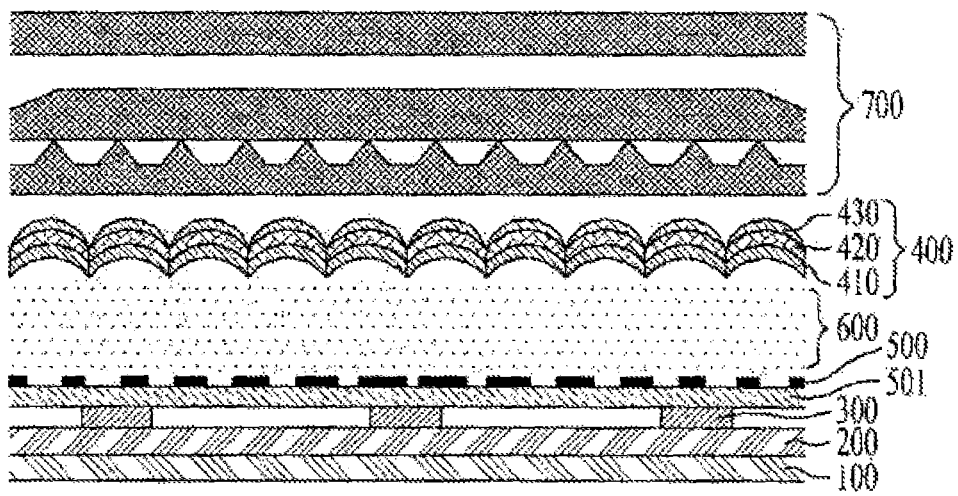
FIG. 7 is a cross-sectional view illustrating a structure of a backlight unit according to an embodiment.

FIG. 7 is a cross-sectional view illustrating a structure of a backlight unit according to an embodiment.

The backlight unit of FIG. 7 is the same as the backlight unit of FIG. 6, excepting that the quantum dot composite film 400 has a patterned shape.

That is, at least one of the first barrier film 410, the quantum dot phosphor film 420 and the second barrier film 430 of the quantum dot composite film 400 has an embossing shape.

A unit size of such an embossing shape may be a unit size of the light-emitting element, or may be greater than the unit size of the light-emitting element.

Therefore, due to such a structure of the embossing shape, an incident angle of light emitted from the semiconductor light-emitting element may be increased. For example, when a blue beam emitted from a blue LED is incident to the quantum dot composite film 400 having the embossing shape, the reflectivity of the blue beam may be relatively high so that diffusion of light may be increased. Therefore, a beam that has passed through the quantum dot composite film 400 may be a uniform white beam.

Figure 8:
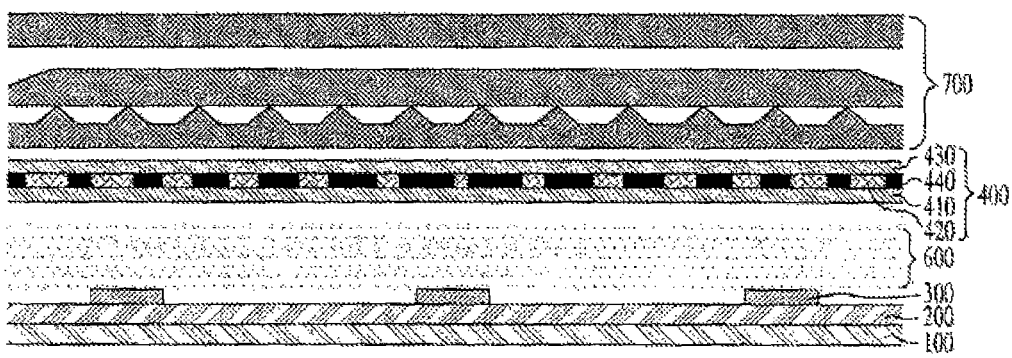
FIG. 8 is a cross-sectional view illustrating a structure of a backlight unit according to an embodiment.

FIG. 8 is a cross-sectional view illustrating a structure of a backlight unit according to an embodiment.

Referring to FIG. 8, a backlight unit includes a substrate 100, a reflective film 200 disposed on the substrate 100, a plurality of light-emitting elements 300 arranged on the reflective film 200, a quantum dot composite film 400 disposed on the semiconductor light-emitting elements 300, and an optical film disposed on the quantum dot composite film 400.

Here, the quantum dot composite film 400 may include a first barrier film 410, a quantum dot phosphor film 420 disposed on the first barrier film 410, a patterned reflective film 440 disposed on the quantum dot phosphor film 420, and a second barrier film 430 disposed on the patterned reflective film 440.

The first barrier film 410 or the second barrier film 430 may be a dichroic mirror barrier film.

Since the patterned reflective film 440 is included in the quantum dot composite film 400, an additional reflective film is not required.

The quantum dot phosphor film 420 may have a patterned structure. The quantum dot phosphor film 420 according to the present disclosure has a hole pattern. However, the quantum dot phosphor film 420 is not limited thereto, and may be provided with various patterns. For example, the quantum dot phosphor film 420 may have a line pattern, a groove pattern or an uneven pattern.

The patterned reflective film 440 may fill at least a part of a gap in the patterned structure of the quantum dot phosphor film 420.

The patterned reflective film 440 may be disposed on the patterned structure of the quantum dot phosphor film 420.

The patterned reflective film 440 may be disposed between the quantum dot phosphor film 420 and the second barrier film 430 as described above, but may be disposed between the first barrier film 410 and the quantum dot phosphor film 420. In this case, light emitted from the light-emitting element meets the quantum dot composite film via the patterned reflective film. Therefore, since this case brings about the same effect as that of placing an additional film between the light-emitting element and the quantum dot composite film, the quantum dot composite film may be less degraded.

According to the present disclosure, since a dichroic mirror barrier film is used as a barrier film of a quantum dot composite film in order to be applied to a backlight unit, the reflectivity of a source beam emitted from a semiconductor light-emitting element is increased, thereby increasing interaction between a quantum dot phosphor and the source beam. Therefore, uniform light may be generated with high photo-conversion efficiency.

Furthermore, since a backlight unit is manufactured using a quantum dot composite film integrated with a patterned reflective film to have combined optical functions, the number of optical films required for a backlight unit that requires various optical films may be remarkably reduced.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

According to the present disclosure, a backlight unit may be manufactured using a quantum dot composite film integrated with a patterned reflective film to have combined optical functions.

Therefore, the number of optical films required for a backlight unit that requires various optical films may be remarkably reduced.

The invention claimed is:

1. A quantum dot composite film comprising:
a first barrier film;
a quantum dot phosphor film disposed on the first barrier film;
a second barrier film disposed on the quantum dot phosphor film; and
a patterned reflective film disposed between the quantum dot phosphor film and the second barrier film,
wherein the first barrier film or the second barrier film is a dichroic mirror barrier film.

2. The quantum dot composite film according to claim 1, wherein at least one of the first barrier film, the quantum dot phosphor film and the second barrier film has an embossing shape.

3. The quantum dot composite film according to claim 1, wherein the quantum dot phosphor film has a hole pattern, a line pattern, a groove pattern or an uneven pattern structure.

4. The quantum dot composite film according to claim 3, wherein the patterned reflective film fills at least a part of a gap in a patterned structure of the quantum dot phosphor film.

5. The quantum dot composite film according to claim 3, wherein the patterned reflective film is disposed on a patterned structure of the quantum dot phosphor film.

6. A backlight unit comprising:
a substrate;
a reflective film disposed on the substrate;
a plurality of semiconductor light-emitting elements disposed on the reflective film;
a quantum dot composite film disposed on the semiconductor light-emitting elements; and
an optical film disposed on the quantum dot composite film,
wherein the quantum dot composite film comprises a first barrier film, a quantum dot phosphor film disposed on the first barrier film, and a second barrier film disposed on the quantum dot phosphor film, and
wherein the first barrier film or the second barrier film is a dichroic mirror barrier film.

7. The backlight unit according to claim 6, further comprising a patterned reflective film disposed between the semiconductor light-emitting elements and the quantum dot phosphor film.

8. The backlight unit according to claim 7, further comprising a diffusion plate disposed between the patterned reflective film and the quantum dot composite film or between the quantum dot composite film and the optical film.

9. The backlight unit according to claim 6, wherein at least one of the first barrier film, the quantum dot phosphor film and the second barrier film has an embossing shape.

10. The backlight unit according to claim 6, wherein the quantum dot composite film comprises a patterned reflective film disposed between the quantum dot phosphor film and the second barrier film.

11. The backlight unit according to claim 10, wherein the quantum dot phosphor film has a hole pattern, a line pattern, a groove pattern or an uneven pattern structure.

12. The backlight unit according to claim 11, wherein the patterned reflective film fills at least a part of a gap in a patterned structure of the quantum dot phosphor film.

13. The backlight unit according to claim 11, wherein the patterned reflective film is disposed on a patterned structure of the quantum dot phosphor film.

14. The backlight unit according to claim 6, wherein the quantum dot composite film comprises a patterned reflective film disposed between the first barrier film and the quantum dot phosphor film.

15. A backlight unit comprising:
a substrate;
a reflective film disposed on the substrate;
a plurality of semiconductor light-emitting elements disposed on the reflective film;
a patterned reflective film disposed on the semiconductor light-emitting elements;
a first barrier film disposed on the patterned reflective film;
a phosphor film disposed on the first barrier film;
a second barrier film disposed on the phosphor film; and
an optical film disposed on the second barrier film.

16. The backlight unit according to claim 15, wherein the phosphor film is a quantum dot phosphor film.

17. The backlight unit according to claim 15, wherein at least one of the first barrier film and the second barrier film is a dichroic mirror barrier film.

18. The backlight unit according to claim 15, wherein at least one of the first barrier film, the phosphor film and the second barrier film has an embossing shape.

19. The backlight unit according to claim 15, wherein the phosphor film has a hole pattern, a line pattern, a groove pattern or an uneven pattern structure.

20. A quantum dot composite film comprising:
a first barrier film;
a quantum dot phosphor film disposed on the first barrier film and having a pattern structure;
a second barrier film disposed on the quantum dot phosphor film; and
protrusions filling gaps in the pattern structure and partially protruding between the first and the second barrier films,
wherein the quantum dot phosphor film includes scatters and red quantum dots and green quantum dots.

21. The quantum dot composite film according to claim 20, further comprising:
a polyethylene material included in the protrusions.

22. The quantum dot composite film according to claim 20, wherein the protrusions are disposed only on one of the first and second barrier films.

23. The quantum dot composite film according to claim 22, wherein the protrusions are disposed on the second barrier film.

24. The quantum dot composite film according to claim 20, wherein the first and the second barrier films comprise a flat film.

25. The quantum dot composite film according to claim 20, wherein the protrusions are spaced apart from each other.

26. The quantum dot composite film according to claim 25, wherein the protrusions are spaced apart unequal distances from each other.

27. The quantum dot composite film according to claim 20, wherein heights of the protrusions are equal to each other.

28. The quantum dot composite film according to claim 20, wherein top and bottom surfaces of the protrusions are flat.

29. The quantum dot composite film according to claim 20, wherein the protrusions extend at least half way between the first and second barrier films.

* * * * *